(12) United States Patent
Mendoza

(10) Patent No.: US 10,864,933 B2
(45) Date of Patent: Dec. 15, 2020

(54) FOUR POSITION HAND TRUCK

(71) Applicant: Harper Trucks, Inc., Wichita, KS (US)

(72) Inventor: José Angel Caceres Mendoza, Wichita, KS (US)

(73) Assignee: HARPER TRUCKS, INC., Wichita, KS (US)

( * ) Notice: Subject to any disclaimer, the term of this patent is extended or adjusted under 35 U.S.C. 154(b) by 32 days.

(21) Appl. No.: 15/996,404

(22) Filed: Jun. 1, 2018

(65) Prior Publication Data

US 2018/0346009 A1 Dec. 6, 2018

Related U.S. Application Data

(60) Provisional application No. 62/514,093, filed on Jun. 2, 2017.

(51) Int. Cl.
*B62B 3/02* (2006.01)
*B62B 5/06* (2006.01)
(Continued)

(52) U.S. Cl.
CPC .............. *B62B 5/067* (2013.01); *B62B 1/002* (2013.01); *B62B 1/12* (2013.01); *B62B 3/02* (2013.01); *B62B 2205/104* (2013.01)

(58) Field of Classification Search
CPC .. B62B 1/002; B62B 1/12; B62B 3/02; B62B 2205/12; B62B 2205/20; B62B 2206/06
See application file for complete search history.

(56) References Cited

U.S. PATENT DOCUMENTS 2,096,994 A * 10/1937 Millen .................... B62B 1/12
                                                        280/38
2,605,117 A *  7/1952 Hooz ...................... B62B 3/12
                                                        280/43
(Continued)

FOREIGN PATENT DOCUMENTS

| CN | 2283599   | * | 6/1998  |
| CN | 104608809 | * | 5/2015  |
| CN | 106004949 | * | 10/2016 |

OTHER PUBLICATIONS

ISR for PCT/US2018/035746; dated Nov. 9, 2018.*

(Continued)

*Primary Examiner* — Emma K Frick
(74) *Attorney, Agent, or Firm* — Robert O. Blinn

(57) ABSTRACT

A hand truck includes a frame that is supported by main wheels and a handle having two side members. Two handle brackets are pivotably mounted on opposite sides of the frame. The handle brackets are arranged for rotation in relation to the frame around a handle rotation axis. The handle brackets slidably receive the side members of the handle so that the handle is able to slide between a first retracted position and a second extended position. The handle is also able to rotate with the handle brackets between first and second rotational positions. A lock mechanism that is mechanically associated with the handle brackets and the handle is able to releasably lock the degree of extension of the handle in at least one position between the retracted and extended positions and is able to lock the rotational position of the handle in at least one rotational position.

10 Claims, 3 Drawing Sheets

(51) Int. Cl.
 *B62B 1/00* (2006.01)
 *B62B 1/12* (2006.01)

(56) References Cited

U.S. PATENT DOCUMENTS

| | | | | |
|---|---|---|---|---|
| 3,655,212 | A * | 4/1972 | Krass | B62B 3/04 |
| | | | | 280/641 |
| 3,702,016 | A * | 11/1972 | Keesee | A01D 34/824 |
| | | | | 16/437 |
| 3,785,669 | A * | 1/1974 | Doheny | B62B 1/002 |
| | | | | 280/47.18 |
| 3,850,441 | A * | 11/1974 | Peters | B62B 1/08 |
| | | | | 280/47.2 |
| 3,873,118 | A * | 3/1975 | Takagi | B62B 1/002 |
| | | | | 280/47.2 |
| 4,009,891 | A * | 3/1977 | Jensen | B62B 1/002 |
| | | | | 280/651 |
| 4,561,674 | A * | 12/1985 | Alessio | B62B 1/20 |
| | | | | 280/47.21 |
| 4,921,270 | A * | 5/1990 | Schoberg | B62B 1/002 |
| | | | | 280/47.27 |
| 5,228,716 | A * | 7/1993 | Dahl | B62B 1/002 |
| | | | | 280/47.18 |
| 5,941,543 | A * | 8/1999 | Kazmark, Jr. | B62B 1/002 |
| | | | | 280/47.29 |
| 6,234,497 | B1 * | 5/2001 | Stahler, Sr. | B62B 1/002 |
| | | | | 280/47.29 |
| 6,308,967 | B1 * | 10/2001 | Stallbaumer | B62B 1/002 |
| | | | | 280/47.18 |
| 6,328,319 | B1 * | 12/2001 | Stahler, Sr. | B62B 1/002 |
| | | | | 280/47.18 |
| 6,364,328 | B1 | 4/2002 | Strahler, Sr. | |
| 6,588,775 | B2 * | 7/2003 | Malone, Jr. | B62B 1/002 |
| | | | | 280/47.18 |
| 8,100,430 | B2 | 1/2012 | Meyers et al. | |
| 8,454,033 | B2 * | 6/2013 | Tsai | B62B 1/002 |
| | | | | 280/47.18 |
| 8,465,046 | B2 | 6/2013 | Meyers et al. | |
| 9,096,249 | B2 | 8/2015 | Gibson | |
| 9,139,214 | B2 | 9/2015 | Rich et al. | |
| 9,211,894 | B2 | 12/2015 | Gibson | |
| 9,365,225 | B2 * | 6/2016 | Henao | B62B 3/02 |
| 9,637,149 | B1 | 5/2017 | Wang | |
| 9,688,298 | B1 * | 6/2017 | Su | B62B 3/02 |
| 9,969,411 | B2 * | 5/2018 | Belotti | B62B 5/06 |
| 10,118,633 | B2 * | 11/2018 | Gibson | B62B 1/002 |
| 2008/0197590 | A1 * | 8/2008 | Tsai | B62B 3/1476 |
| | | | | 280/47.18 |
| 2012/0242063 | A1 * | 9/2012 | Bruckner | B62B 3/04 |
| | | | | 280/651 |
| 2016/0236699 | A1 * | 8/2016 | Wang | B62B 1/12 |
| 2016/0272229 | A1 * | 9/2016 | Buckner | B62B 5/0003 |

OTHER PUBLICATIONS

Written Opinion for PCT/US2018/035746; dated Nov. 9, 2018.*
Lon Mascarenas, Prior art work, 1 pg, Feb. 6, 2020, Lon Mascarenas, home.†

* cited by examiner
† cited by third party

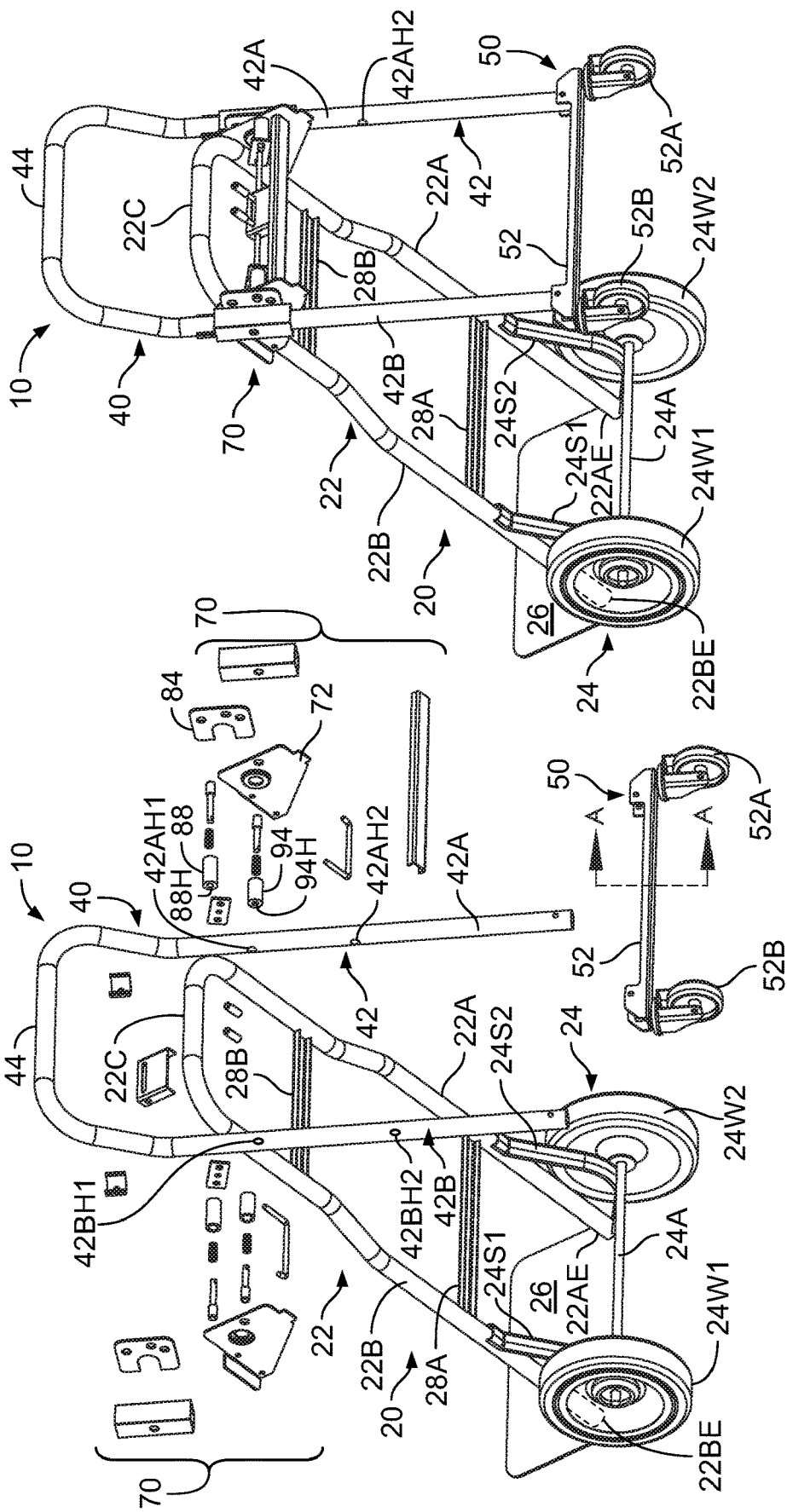

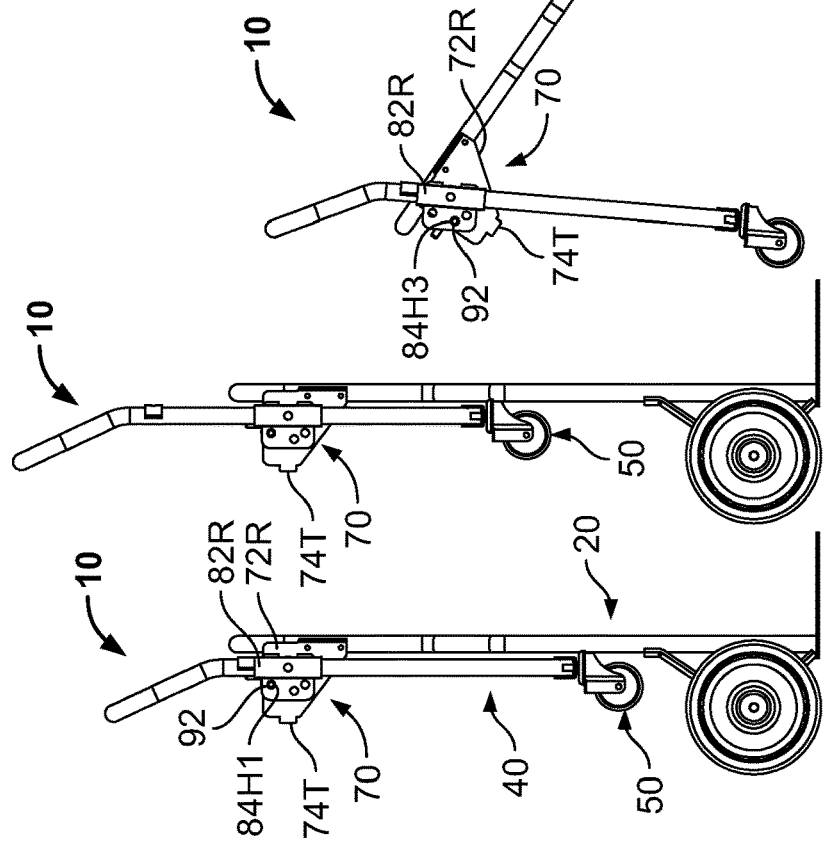

US 10,864,933 B2

FOUR POSITION HAND TRUCK

RELATED APPLICATIONS

This application claims the benefit of U.S. Provisional Patent Application No. 62/514,093 filed on Jun. 2, 2017, which is incorporated herein by reference in its entirety.

FIELD

This application relates to a hand truck that is able to be used in a plurality of configurations.

BACKGROUND

Prior art hand trucks are known that can be used in more than one configuration. Hand trucks are often used upright configuration in which the hand truck is supported by its main wheels and pushed about by means of a handle which is generally parallel to the truck frame or an extension of the hand truck frame. Some hand trucks have a repositionable handle that may be mounted either parallel to the hand truck frame or at a right angle to the hand truck frame, opposite from the main wheels. Such hand trucks also have wheels that are spaced away from the main wheels so that the hand truck may be used as a four-wheeled cart. Other hand trucks have handle assemblies that also carry caster wheels at their lower ends. Such hand trucks have handles that can be repositioned upon the truck frame so that the truck frame is supported in an inclined position in which the truck frame is supported by the main wheels and the handle assembly caster wheels. All of these hand truck configurations are useful in the wide variety of situations that arise in industrial and parcel delivery service, where time may be of the essence and space may be limited. In such situations, it would be desirable to have a hand truck that could be transformed between the above described configurations quickly and easily. Accordingly, a need exists for a hand truck that can be quickly and easily transformed between various hand truck configurations.

SUMMARY

The above described need is addressed by a hand truck that includes a frame and a handle. The frame is supported by main wheels that are mounted to one end of the frame. The handle includes at least one side member.

At least one handle bracket is pivotably mounted at least indirectly to the frame at a location that is spaced away from the main wheels. The handle bracket is arranged for rotation around a handle rotation axis between a first rotational position and a second rotational position. The handle bracket is also arranged to slidably receive the side member of the handle so that the handle is able to slide between a first retracted position and a second extended position. Thus, the handle may be rotated between a first rotational position and a second rotational position and is able to slide between the retracted and extended positions.

A lock mechanism is mounted to the frame and is mechanically associated with the frame and the handle. The lock mechanism is arranged to releasably lock the handle in at least one handle position that is between, or includes, at least one of the first retracted and the second extended positions and to also releasably lock the handle in a rotational handle position that is between, or includes, at least one of the first rotational position and the second rotational position.

BRIEF DESCRIPTION OF THE DRAWINGS

FIG. 1 is a perspective view of one embodiment of a four position hand truck.

FIG. 2 is an exploded perspective view of one embodiment of a four position hand truck.

FIG. 2A is a cross-sectional view of the cross member of the caster wheel assembly taken from plane A-A indicated in FIG. 2.

FIG. 3 is a side view of one embodiment of a four position hand truck showing a four position hand truck in an upright position with the handle assembly in the retracted position.

FIG. 4 is a side view of one embodiment of a four position hand truck showing a four position hand truck in the upright position with the handle assembly partially extended.

FIG. 5 is a side view of one embodiment of a four position hand truck showing a four position hand truck in the inclined position with the handle assembly in the retraced position and pivoted to an intermediate angled position wherein the handle assembly defines an acute angle with the frame assembly.

FIG. 6 is a side view of one embodiment of a four position hand truck showing a four position hand truck in the horizontal cart position with the handle assembly in the fully extended position and pivoted to a position that is at a right angle to the frame assembly.

DETAILED DESCRIPTION

Figure 7:
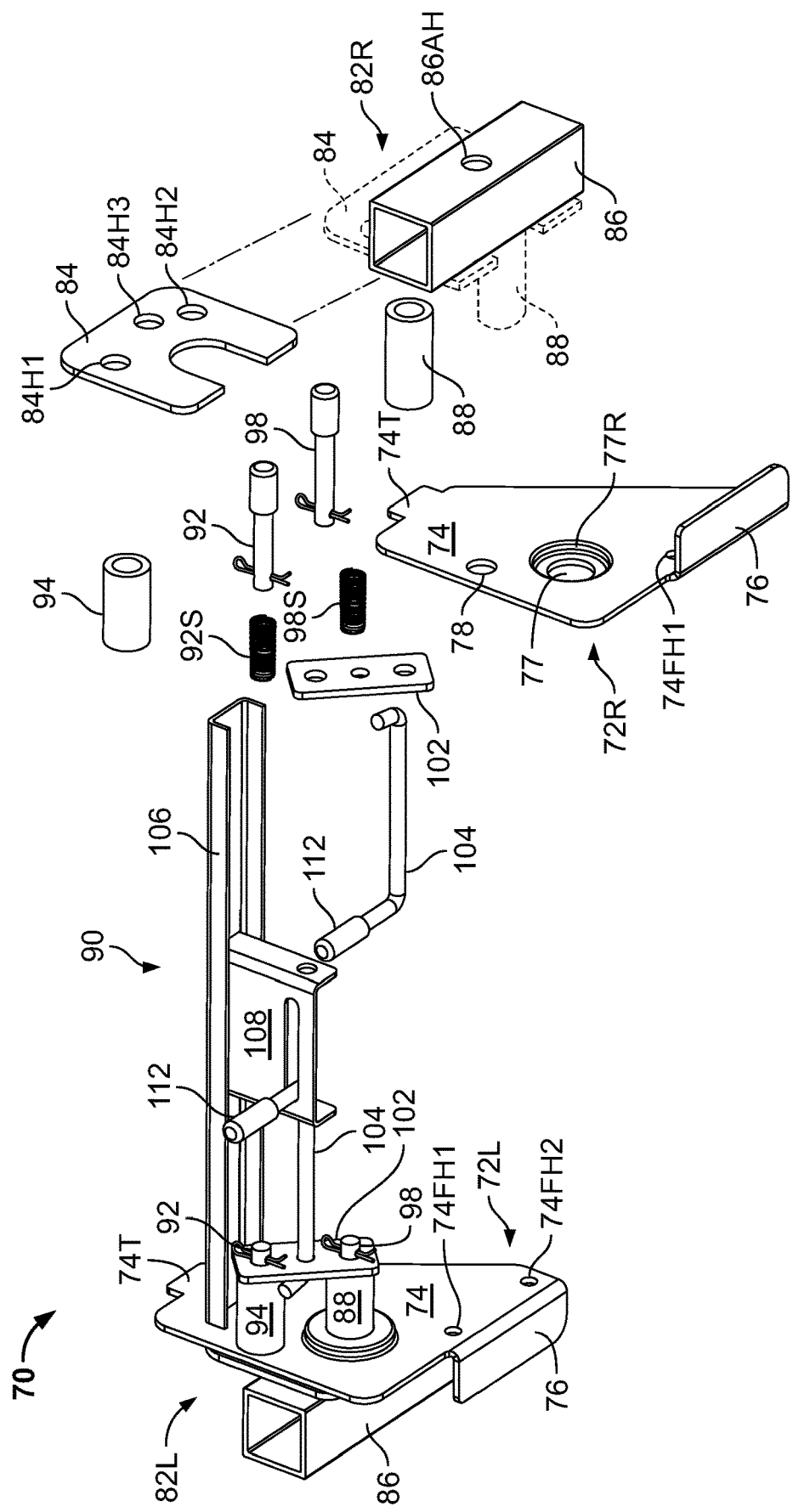
FIG. 7 is an isolated partially exploded perspective view of a head assembly of one embodiment of a four position hand truck.

Referring to the drawings, FIG. 1 shows one embodiment of a multi-position hand truck 10. As can be seen in FIG. 1, hand truck 10 includes a frame assembly 20, a handle assembly 40 and a head assembly 70.

As is shown in FIGS. 1 and 2, frame assembly 20 includes a frame member 22, a wheel assembly 24 and a load supporting member 26. In this example, the load supporting member is a truck pan, which is also known to those skilled in the art as a toe plate. In this example, frame member 22 is a steel tube that is formed into an elongated U shape. Frame member 22 includes right and left side members 22A and 22B and an upper cross member 22C. Upper cross member 22C extends between the upper ends of side members 22A and 22B. Side members 22A and 22B terminate at lower ends 22AE and 22BE respectively. Frame assembly 20 may also include cross members 28A and 28B that are spaced along frame assembly 20 and extend between frame side members 22A and 22B. In this example, truck pan 26 is fixed to lower ends 22AE and 22BE of frame side members 22A and 22B respectively.

Frame 22 is supported by wheel assembly 24. As can be seen in FIG. 1, a pair of wheel struts 24S1 and 24S1 are fixed to the lower ends on each side of frame member 22. A wheel axel 24A supports a pair of main wheels 24W1 and 24W2. Much of the arrangement of frame assembly 20 should be understood by the skilled reader as being typical for a hand truck. The skilled reader may be able to envision a multitude of optional designs and materials which may be selected for frame assembly 20 and wheel assembly 24.

As is shown in FIGS. 1 and 2, handle assembly 40 includes a handle member 42 and a caster wheel assembly 50. Handle member 42 is fashioned from a formed length of steel tube that is formed into a U shape. Handle member 42 has two side members 42A and 42B that are spaced apart and parallel to each other. Side members 42A and 42B are connected at their upper ends by a transverse handle member 44. Side members 42A and 42B also present spaced symmetrically located locking holes, namely, locking holes 42AH1 and 42AH2 on the inboard surface of side member 42A and locking holes 42BH1 and 42BH2 on the inboard surface of side member 42B (shown with hidden lines in FIG. 2). The purpose of locking holes 42AH1, 42AH2, 42BH1 and 42BH2 will be discussed in detail below.

Caster wheel assembly 50 connects between the lower ends of side members 42A and 42B. Caster wheel assembly 50 presents two spaced apart downwardly extending caster wheels 52A and 52B. As is shown in FIG. 2A, which is taken from plane A-A indicated in FIG. 2, caster wheel assembly 50 includes a cross member 52 which is fashioned from a channel. The channel of cross member 52 is oriented as shown in FIG. 2A so that it is able to receive tabs that are presented by the frame brackets of the head assembly 70, as will be described in greater detail below.

As is also shown in FIGS. 1-6, handle assembly 40 is slidably and pivotably mounted to frame assembly 20 by head assembly 70. Head assembly 70 is arranged so that it is possible to slide handle assembly 40 with respect to frame assembly 20 between a first retracted position, as shown in FIGS. 3 and 5, and a second extended position, as shown in FIG. 6, as well as a partially extended position as shown in FIG. 4. Head assembly 70 is also arranged so that it is possible to pivot handle assembly 40 with respect to frame assembly 20 between a first parallel position as shown in FIGS. 3 and 4, and a second right angle position as shown in FIG. 6, as well as an intermediate angled position as shown in FIG. 5.

Head assembly 70 is shown in detail in FIG. 7. As can be seen in FIG. 7, head assembly 70 includes right and left frame brackets 72R and 72L, right and left handle brackets 82R and 82L and a lock and release mechanism 90. Frame brackets 72R and 72L are fixed to frame member 22 on the outside surfaces of right and left side members 22A and 22B respectively near the upper ends of those side members. Since frame brackets 72R and 72L are symmetrically identical, it is possible to describe both frame brackets 72R and 72L by describing just one frame bracket, 72R.

Frame bracket 72R includes a plate 74 and a return flange 76. Return flange 76 is present in this example to strengthen frame bracket 72R. In this example, as can been seen in FIG. 1, right side member 22A of frame assembly 20 is fastened on the outside surface of right side member 22A to the inside surface of plate 74. A pair of fastener holes, 74FH1 and 74FH2, located opposite from return flange 76, are used for installing fasteners common to the frame assembly member and plate 74. Plate 74 presents a pivot shaft hole 77. Pivot shaft hole 77 also has a recess feature 77R which will be further explained below. Plate 74 also presents a rotation locking hole 78 that is spaced away from pivot shaft hole 77. Rotation locking hole 78 will also be further explained below. And finally, the edge of plate 74 that is opposite frame side member 22A presents a tab 74T, which is shaped and sized to be received by the channel presented by cross member 52 of caster wheel assembly 50. This helps to secure frame 20 in the horizontal cart position shown in FIG. 6.

Handle bracket 82R is arranged to be pivotably mounted on frame bracket 72R and to slidably receive right side member 42A of handle assembly 40. Likewise, symmetrically opposite handle bracket 82L is also arranged to be pivotably mounted to frame bracket 72L and is able to slidably receive left side member 42B of handle assembly 40. Handle bracket 82R includes a rotation locking plate 84, a handle slide tube 86 and a pivot shaft 88. Rotation locking plate 84 is preferably welded, or bonded, to slide tube 86 and pivot shaft 88 is also preferably welded to slide tube 86. Accordingly, locking plate 84, slide tube 86 and pivot shaft 88 are all fixed or welded together to complete handle bracket 82R.

In this example, rotation locking plate 84 presents three locking holes: locking hole 84H1 for parallel positioning of handle assembly 40, locking hole 84H2 for right angle positioning of handle assembly 40 and locking hole 84H3 for intermediate or acute angled positioning of handle assembly 40. Slide tube 86 also presents a locking hole 86LH (indicated in FIG. 2) which is directly opposite assembly hole 86AH.

As is shown in FIG. 7, pivot shaft 88 is received by pivot shaft hole 77 of frame bracket 72A. As can be seen in FIG. 1, slide tube 86 slidably receives one of handle members 42A or 42B. In this example, slide tube 86 is welded to rotation locking plate 84. Pivot shaft 88 is welded to slide tube 86 so that it is aligned with assembly hole 86AH and slide locking hole 86LH (indicated in FIG. 2). Because a weldment may arise at the periphery of pivot shaft 88 where pivot shaft 88 is welded to slide tube 86, recess 77R of frame bracket 72R is provided to prevent interference with such a weldment.

Lock and release mechanism 90 is mechanically associated with frame brackets 72R and 72L and handle brackets 82R and 82L and is able to be manipulated to selectively unlock handle brackets 82R and 82L to allow rotation of handle assembly 40 and to unlock handle assembly 40 to allow sliding movement of handle assembly 40 with respect to handle brackets 82R and 82L and thus frame assembly 20. In this example, lock and release mechanism 90 is biased toward a locked position in which handle sliding movement and rotation are locked.

As can be best seen in FIG. 7, a rotation lock pin 92 is received by a rotation lock pin keeper 94. In this example, lock pin keepers 94 and 88 are generally cylindrical and present an internal channel suitable for receiving a lock pin. The pin keepers present relatively narrow openings at their inboard ends for passage of the narrow inboard portions of the lock pins, as will be described in further detail below. As can be seen in FIG. 7, rotation lock pin 92 includes a wide portion and a narrow portion. The narrow portion of lock pin 92 carries a spring 92S and extends through a hole 94H defined in the inboard end of rotation lock pin keeper 94 (hole 94H is indicated in FIG. 2). Rotation lock pin keeper 94 is welded to frame bracket 74 (at the location shown on the left side of FIG. 7) so that rotation lock pin keeper 94 and rotation lock pin 92 are aligned with rotation locking hole 78 (shown on the right side of FIG. 7). Spring 92S biases rotation lock pin 92 toward an extended position suitable for locking out the rotation of handle assembly 40.

In a similar fashion, a slide lock pin 98 is received by pivot shaft 88, which is formed from a section of cylindrical tube for that purpose. However, the inboard end of pivot shaft 88 is partially closed and presents a narrower hole 88H (indicated in FIG. 2). (As noted above, pivot shaft 88 is part of the welded together assembly of handle bracket 82R or 82L.) Slide lock pin 98 also has a narrow portion which carries a spring 98S. The narrow portion of slide lock pin 98 also extends out through a hole 88H defined in the inboard end of pivot shaft 88. Spring 98S which is seated within pivot shaft 88 also biases slide lock pin 98 toward an extended position. Assembly hole 86AH makes it possible to insert slide lock pin 98 (with spring 98S mounted on it) through opposite lock hole 86LH (indicated in FIG. 2) and into pivot shaft 88. Thus, slide lock pin 98 moves between an extended position and a retracted position. When in the extended position, slide lock pin 98 extends into one of the locking holes (42AH1, 42AH2, 42BH1 and 42BH2 shown in FIG. 2) of one of the frame side members (42A and 42B) thereby locking out the sliding movement of handle assembly 40 with respect to frame assembly 20. When in the retracted position, slide lock pin 98 is withdrawn from one of the corresponding locking holes in order to permit sliding movement of handle assembly 40 with respect to frame assembly 20.

As can be seen on the left side of FIG. 7, rotation lock pin 92 and slide lock pin 98 extend through the ends of their respective keepers and are attached to a common bridge plate 102 by means of typical cotter pin connections (the cotter pins may be seen on the left side of FIG. 7). Bridge plate 102 connects pins 92 and 98 but not in a rigid manner so that when, on occasion, one pin is able to extend into a locking hole, while the other pin may not be able to extend into one of its corresponding locking holes (as might be the case when handle assembly 40 is fully extended), the pin that can extend into a locking hole, is able to do so. The non-rigid connection allows one pin to extend even if the other is not able to extend.

As can be seen in FIG. 7, a linkage arrangement is employed to provide a way to simultaneously pull on opposite bridge plates 102 on opposite sides of head assembly 70 and thereby simultaneously move locking pins 92 and 98 from the extended position, which is effective for locking out both the sliding and pivoting movement of handle assembly 40, to a retracted position, in which such sliding and pivoting movement of handle assembly 40 is able to occur. In this example, opposite bridge plates 102 are connected to links 104 that, in turn, extend toward the center of frame assembly 20. Head assembly 70 includes a link support member 106 that spans between opposite side members of frame assembly 20 and a centrally mounted handle support plate 108. Handle support plate 108 is arranged to receive and present, in this example, a pair of upstanding link handles 112. Link handles 112 are defined at the inboard ends of links 104. In this example, link handles 112 are arranged in close proximity so that they can be manually drawn toward each other in order to translate locking pins 92 and 98 on both sides of head assembly 70 from a biased extended position to a retracted position. Slide lock pins 98 are sufficiently longer than rotation lock pins 92 so that it possible to unlock handle assembly 40 for rotation while still locking out the sliding movement of handle assembly 40.

Although linkage rods are used in this example, the skilled reader will appreciate that any suitable mechanism that is able to simultaneously apply pulling forces to the locking pins may be employed. One can easily envision alternative mechanisms that might employ cables or even hydraulics. The skilled reader should also appreciate that because locking holes and pins are used throughout the above described head assembly 70, it would be advisable to employ strong durable materials such as steel tubing and steel plate. For example, slide lock pin 98 will likely transfer substantial loads into handle side members 42A and 42B at locking holes 42AH1, 42AH2, 42BH1 and 42BH2. Accordingly, a strong, tough material should be chosen for handle side members 42A and 42B or the areas surrounding locking holes 42AH1, 421AH2, 42BH1 and 42BH2 might preferably be reinforced.

The operation of hand truck 10 may be best understood by referring to FIGS. 1, 3-6 and 7. As can be seen in FIG. 3, rotation locking pin 92 is aligned with rotation locking hole 84H1 of handle bracket 82R for parallel positioning of handle assembly 40. Also in FIG. 3, slide lock pin 98 is extended through handle locking hole 42AH1 of handle member 42. With regard to the discussion of the locking pin positions immediately above all of the other description hereinafter, the skilled reader should understand that rotation locking pin 92 and slide lock pin 98 on the left side of head assembly 70 will operate in a manner that is symmetrical to the operation on the right side. For clarity and brevity, at some points in this discussion, only the right side elements may be referred to.

In order to release the above described locked configuration, lock and release mechanism 90 (shown in FIG. 7) is manipulated by pulling linkage handles 112 toward each other. This action withdraws pins 92 and 98 from the locking holes described above. So, for example, when handle assembly 40 is unlocked, it may be slid to a partially extended position as shown in FIG. 4. If an operator merely releases the inward pressure on linkage handles 112, slide lock pins 98 will slide into handle member lock holes 42AH2 and 42BH2 (indicated in FIG. 2) thereby locking handle assembly 40 in the partially extended position as shown in FIG. 4. The skilled reader will note that in FIG. 4, as in FIG. 3, rotation locking pins 92 are still seated in the handle bracket locking holes for the parallel handle position, namely locking holes 84H1 of right and left handle brackets 82R and 82L.

In order to reconfigure hand truck 10 from the upright position shown in FIG. 3 to the angled position shown in FIG. 5, rotation locking pins 92 are withdrawn to the retracted position by squeezing linkage handles 112 together. Handle assembly 40 is rotated until rotation locking pins 92 are no longer aligned with locking holes 84H1 for the parallel handle position. The operator may release pressure on linkage handles 112 so that the outwardly biased rotation pins 92 slide along the inside faces of handle brackets 82R and 82L. When rotation pins 92 encounter rotation locking holes 84H3, rotation pins 92 extend into rotation locking holes 84H3 thereby locking handle assembly 40 in the angled position shown in FIG. 5.

In order to reconfigure hand truck 10 into the horizontal cart position shown in FIG. 6, the rotation and sliding locking pins 92 and 98 are both withdrawn to a retracted position as described above (by pulling linkage handles 112 together). Handle assembly 40 is slid to a fully extended position until slide tubes 86 of handle brackets 82R and 82L bottom out on handle side members 42A and 42B and tabs 74T of frame brackets 72R and 72L are received by the upward oriented channel of caster wheel assembly 50. When in this position, handle assembly 40 is also rotated into the right angle position shown in FIG. 6. If linkage handles 112 are released so that locking pins 92 and 98 are biased toward the extended position and if handle assembly 40 is rotated to the right angle position shown in FIG. 6, rotation locking pins 92 will fall into rotation locking holes 84H2 of right and left handle brackets 82R and 82L thereby securing handle assembly 40 in the right angle position shown in FIG. 6.

As can be seen from the above description, hand truck 10 meets the needs noted above by providing a hand truck that can be rapidly reconfigured in at least four configurations. While certain options were disclosed above for accomplishing releasable, selective locking and positioning in terms of the extension of handle assembly 40 and its angular orientation relative to truck frame assembly 20, any one of a number of mechanisms for accomplishing such selective simultaneous locking and unlocking may be employed.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A multi-position hand truck comprising:
a frame assembly including a frame which has a first end and a second opposite end, a load supporting member mounted to the first end of the frame and a pair of main wheels rotatably mounted to the first end of the frame adjacent to the load supporting member,
a handle assembly including two spaced apart generally parallel elongated handle side members, each handle side member having an upper end and a lower end, a top handle member connecting between the upper ends of the handle side members, each handle side member also presenting at least two spaced handle extension locking holes and a caster wheel assembly mounted to the lower ends of the handle side members, the caster wheel assembly presenting two spaced apart caster wheels,
a head assembly that includes two frame brackets that are fixed to the opposite sides of the frame of the frame assembly toward the second end of the frame, a pair of handle brackets that each include a slide portion that is suitable for slidably receiving one of the handle side members of the handle assembly such that the handle assembly is able to slide between handle extension positions including a first retracted position, second extended position and a third intermediate position between the retracted position and the extended position, each handle bracket also presenting a rotation plate which presents a pattern of handle rotation position locking holes, each handle bracket being rotatably mounted to one of the frame brackets for rotation about a handle rotation axis, each frame bracket carrying a slide locking pin which is aligned with the handle rotation axis, each slide locking pin being slidaby mounted to each one of the frame brackets for movement between a first extended position in which the slide locking pin is able to extend into one of the handle extension locking holes of a handle side member thereby securing the handle assembly in one of the handle extension positions, and a second retracted position wherein the slide locking pin is withdrawn from one of the handle extension locking holes of the handle side member thereby allowing the handle member to slide with respect to the frame bracket and the frame assembly between desired handle extension positions, each frame bracket also carrying a handle rotation locking pin which is able to move between a first extended position and a second retracted position, such that when the handle rotation locking pin is in the first extended position, the handle rotation locking pin is able to extend into one of the rotation position locking holes of the rotation plate of the handle bracket thereby locking the handle assembly in one of at least three handle positions, namely, a first parallel position wherein the handle assembly is generally parallel to the frame assembly, a second right angle position wherein the handle assembly is generally at a right angle to the frame assembly and a third angled position which is between the first parallel position and the second right angle position, and such that when the handle rotation locking pin is in the second retracted position, the handle assembly is able to rotate between the first and second positions, the head assembly further including a manually operable release mechanism which is able to be manually manipulated in order to simultaneously move the handle rotation locking pins and the slide locking pins of each frame bracket between the first extended position and the second retracted position,
whereby when the slide locking pins and the handle rotation locking pins are moved to the second retracted position it is possible to manually rearrange the hand truck into one of at least four configurations, including a first upright position in which the handle assembly is in the first retracted position and parallel to the frame assembly, a second upright position in which the handle assembly is partially extended and parallel to the frame assembly, a cart position in which the handle assembly is fully extended and at a right angle in relation to the frame assembly so that the frame assembly is generally horizontal and is supported by the main wheels and the caster wheels, and an angled position wherein the handle assembly is partially extended and the handle assembly defines an acute angle with the frame assembly so that the inclined frame assembly is supported by both the main wheels and the caster wheels.

2. The multi-position hand truck of claim 1, wherein;
the manually operable release mechanism of the head assembly includes a linkage which is mechanically connected to both handle rotation locking pins and both slide locking pins, the linkage being arranged for simultaneous manual actuating of both handle rotation locking pins and both slide locking pins from their extended locking positions to their retracted unlocking positions.

3. The multi-position hand truck of claim 1, wherein;
the manually operable release mechanism of the head assembly is also arranged so that as the rotation locking pins and the slide locking pins are being simultaneously manually actuated, the handle rotation locking pins disengage their respective rotation locking holes of each handle bracket before the slide locking pins disengage their respective locking holes of the handle assembly.

4. A multi-position hand truck comprising:
a frame portion and a handle portion, the handle portion including at least one elongated side handle member, the frame portion including a frame, a set of main wheels, a load carrying member and a head assembly, the load carrying member being fixed to a first end of the frame and the set of main wheels being rotatably mounted to the frame adjacent to the first end of the frame, the head assembly being mounted to the frame towards a second end of the frame that is opposite the first end, the head assembly including at least one handle bracket that is rotatably mounted at least indirectly to the frame for rotation about a handle rotation axis so that the handle portion is able to be rotated with respect to the frame portion between a first rotational position and a second rotational position, the handle bracket also being arranged to slidably receive the at least one elongated side handle member of the handle portion so that the handle portion is able to be slidably adjusted with respect to the frame portion between a first retracted position and a second extended position, the head assembly further including a first releasable lock and a second releasable lock, the first releasable lock for selectively locking the handle bracket in at least one fixed rotational position relative to the frame portion, the second releasable lock for selectively locking the degree of extension or retraction of the handle portion with respect to the frame portion in at least one extended position, the first and second releasable locks being arranged on the head assembly and being controlled by a manually actuated mechanism that is able to unlock both the rotation of the handle portion and the sliding movement of handle portion such that the rotation of the handle portion is unlocked before the sliding movement of the handle portion is unlocked.

5. The multi-position hand truck of claim 4, wherein;
the handle portion includes two side handle members and the frame portion has first and second opposite sides and a handle bracket is rotatably mounted to the frame portion on each of the first and second opposite sides of the frame portion.

6. The multi-position hand truck of claim 5, wherein;
each handle bracket includes a rotation shaft that is rotatably mounted at least indirectly to the frame portion and each handle bracket presents at least one rotation locking hole, and wherein the first releasable lock includes a slide locking pin that is carried by at least one of the rotation shafts, the slide locking pin being able to move between a retracted position and an extended position and being biased toward the extended position, and at least one of the side members of the handle portion includes at least one locking hole arranged for receiving the slide locking pin when the slide locking pin is in the extended position, and wherein the second releasable lock includes a rotation locking pin that is carried by the head assembly and that is able to move between an extended position and a retracted position, the rotation locking pin also being biased toward the extended position, the rotation locking pin being arranged such that the rotation locking hole that is presented by the handle bracket is able to receive the rotation locking pin when the rotation locking pin is in the extended position, and a linkage mechanism that is able to be manually actuated to move both the rotation locking pin and the slide locking pin from the extended position to the retracted position.

7. The multi-position hand truck of claim 6, wherein;
both of the rotation shafts carry a slide locking pin and both side members of the handle portion include at least one locking hole arranged for receiving a slide locking pin when the slide locking pin is in the extended position, and both handle brackets present at least one rotation locking hole and a rotation locking pin is mounted at least indirectly to both sides of the frame portion and the linkage mechanism is arranged for simultaneous manual actuation of both rotation locking pins and both slide locking pins.

8. The multi-position hand truck of claim 7, wherein;
the linkage mechanism is arranged so that as the rotation locking pins and the slide locking pins are being manually actuated, the rotation locking pins disengage their respective rotation locking holes of each handle bracket before the slide locking pins disengage their respective slide locking holes of the handle portion.

9. A multi-position hand truck, comprising:
a frame having a first end and a second opposite end and main wheels mounted to the frame adjacent to the first end thereof,
a handle including at least one side handle member, the handle having an upper end and an opposite lower end that presents at least one wheel,
a head assembly that is fixed to the frame adjacent to the second end thereof, the head assembly including at least one frame bracket that is fixed to the frame and at least one handle bracket that is rotatably mounted to the at least one frame bracket, the handle bracket slidably receiving the at least one side handle member, the head assembly further including a locking mechanism including a first lock for locking out the rotation of the handle bracket and a second lock for locking out the sliding movement of the handle and a mechanism that can be manually actuated to simultaneously release both the first and second locks,
the handle, the handle bracket, the frame and the head assembly being arranged such that frame and the handle are able to be set in at least three positions, a first position in which the handle is generally parallel to the frame, a second position in which the handle is extended and the handle is generally normal to the frame and a third position in which the handle is between the parallel position and the normal position such that the frame is sloped, the head assembly and the locking mechanism arranged to releasably secure the handle from sliding and rotating when in at least the first and third positions and at least from rotating when in the second position.

10. The multi-position hand truck of claim 9, wherein;
the handle includes two parallel spaced handle members and the head assembly presents two spaced apart handle brackets that are rotatably mounted to the frame and that are able to slidably receive the handle members.

* * * * *